United States Patent [19]
Seidle

[11] 3,898,746
[45] Aug. 12, 1975

[54] DRIVER TRAINER SYSTEM

[75] Inventor: Norman R. Seidle, Vestal, N.Y.

[73] Assignee: The Singer Company, Binghamton, N.Y.

[22] Filed: Feb. 6, 1973

[21] Appl. No.: 330,001

[52] U.S. Cl. ................................................. 35/11
[51] Int. Cl. ............................................. G09b 9/02
[58] Field of Search............ 35/5, 8 R, 9 R, 9 A, 11, 35/12 F, 12 N, 12 W, 48 R, 48 B, 10, 10.2; 273/1 E

[56] References Cited
UNITED STATES PATENTS

| | | | |
|---|---|---|---|
| 3,190,014 | 6/1965 | Rhodes | 35/48 R |
| 3,266,174 | 8/1966 | Bechtol et al. | 35/11 |
| 3,283,418 | 11/1966 | Brewer et al. | 35/11 |
| 3,300,877 | 1/1967 | Feder | 35/9 A |
| 3,427,732 | 2/1969 | Wopart | 35/11 X |
| 3,460,270 | 8/1969 | Blitz et al. | 35/6 |
| 3,512,270 | 5/1970 | Chedister | 35/11 |
| 3,560,644 | 2/1971 | Petrocelli et al. | 35/11 X |
| 3,619,912 | 11/1971 | Conant et al. | 35/12 N |
| 3,647,926 | 3/1972 | Rohloff et al. | 35/48 R |
| 3,694,930 | 10/1972 | Howland et al. | 35/12 F |

Primary Examiner—Robert W. Michell
Assistant Examiner—Vance Y. Hum
Attorney, Agent, or Firm—James C. Kesterson; Jeffrey Rothenberg

[57] ABSTRACT

A plurality of simulator cars each have simulated controls and simulated instruments which simulate the controls and instruments of a motor vehicle. The simulated controls are manipulated to perform vehicular functions, signals representative of the position of the simulated controls being provided to a digital computer which processes same. In response thereto, signals are provided by the digital computer to the simulated instruments. Additionally connected to the digital computer is an instructor's console which indicates desired and actual performance of the vehicular functions and provides an indication when the percentage of correct performances of a selected function is less than a selected percentile number. In an automatic mode of operation, a view of a roadway on a film is projected upon a screen which may be viewed by students within the simulator cars. Binary coded signals from the sound track of the film provide to the computer indications of desired performance of vehicular functions associated with the roadway view. In a manual mode of operation, an image on a slide may be projected on a screen and an instructor may ask questions relating to the image, indications of the answers by the students being provided on the console. In response to correct answers, an indication thereof is provided within simulator cars where the students provided the correct answers.

9 Claims, 8 Drawing Figures

DRIVER TRAINER SYSTEM

BACKGROUND OF THE INVENTION

1. Field of the Invention

This invention relates to education systems and more particularly to apparatus for training and testing individuals in the operation of an automobile or other motor vehicle.

2. Description of the Prior Art

In industrialized countries, such as the United States, driving a motor vehicle is an essential skill shared by substantially all of the adult population. Certification by a State to drive a vehicle is often necessary for a person to earn a livelihood.

Apparatus (referred to as driver trainers) for training students in manipulative skills used in driving a vehicle and exposing students to simulated situations encountered in driving are exemplified by disclosures in U.S. Pat. Nos. 2,870,548, 3,015,169 and 3,108,384.

Driver trainers also have utility in underdeveloped countries where young men may only have experience in driving camels and horses thereby not being conditioned to perceive the situations encountered in driving a vehicle. When these young men enter a military service, for example, it is usually less expensive and safer to train them in a driver trainer than in an expensive vehicle.

Driver trainers in the prior art have not utilized modern computer technology and a learning trend indicator which provides to an instructor an immediate indication of the effectiveness of different aspects of a course of driver training.

Heretofore, techniques for scoring responses of students has been cumbersome, time-consuming and expensive.

SUMMARY OF THE INVENTION

An object of the present invention is to provide a driver trainer for training students in manipulative skills used in driving a vehicle and exposing students to simulated situations encountered in driving.

Another object of the present invention is to provide a driver trainer which includes apparatus for providing to an instructor an indication of the effectiveness of different aspects of a course of instruction in driver training.

According to the present invention, a simulator motor vehicle provides to a digital computer function signals respectively representative of the position of simulated controls which are manipulated to perform vehicular functions; a console connected to said digital computer indicates desired and actual performance of the vehicular functions and provides an indication if the percentage of correct performances if a selected function is less than a selected percentile member.

In one specific embodiment, a view of a roadway is projected upon a screen with binary coded signals from the sound track of a projection film providing indications of desired performance of vehicular functions associated with the roadway view.

Driver trainers constructed in accordance with the present invention utilize computer technology whereby they are computed reliably and provide a grade trend indication not known in the prior art.

Other objects, features and advantages of the present invention will become more apparent in the light of the following detailed description of a preferred embodiment thereof.

DESCRIPTION OF THE PREFERRED EMBODIMENT

General Description

Figure 1:
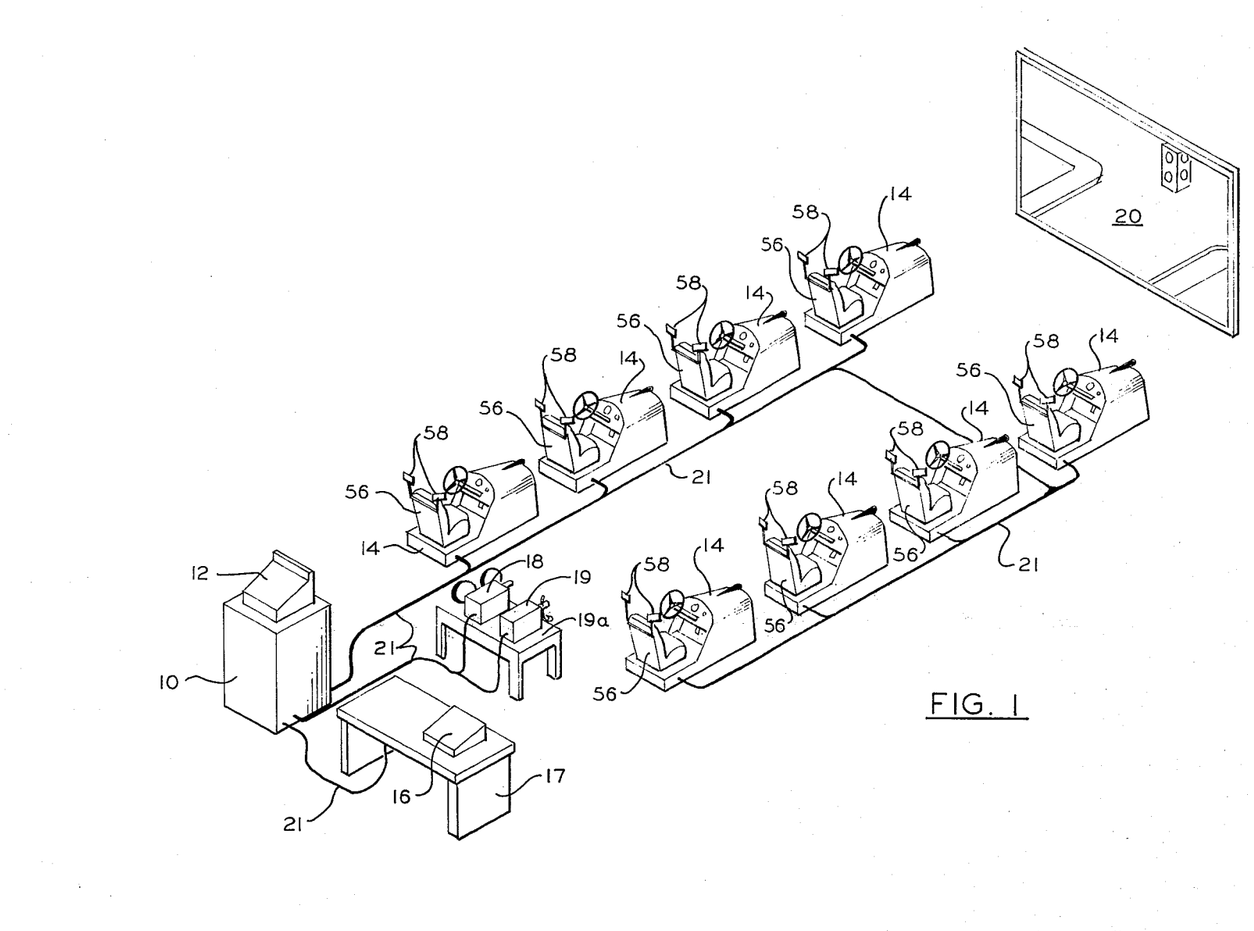
FIG. 1 is a perspective view of the preferred embodiment of the present invention.

Referring now to FIG. 1, deployed within a classroom is a driver trainer system comprised of a pedestal cabinet 10 wherein a digital mini-computer, such as a NOVA 1210 manufactured by Data General, is connected to interface circuits. Assembly language programmed mini-computers are well-known in the computer art and are readily programmed to process electrical signals generated, as hereinafter described, in a driver trainer system. Mounted on top of the cabinet 10 is an instructor's console 12 which is connected to the interface circuits. Also deployed within the classroom are a plurality of similar simulator cars 14 each having a predetermined numerical designation, an input/output keyboard printer 16 mounted on a desk 17, and a table 19a upon which are placed a motion picture projector 18 and a slide projector 19. A motion picture and the image on a slide may be respectively projected by the projectors 18, 19 upon a screen 20. The simulator cars 14, the keyboard 16 and the projectors 18, 19 are all connected to the interface circuits through a plurality of signal lines included in a cable 21. Respectively seated within simulator cars 14, a plurality of students may view a projection of a motion picture or a slide image upon the screen 20.

As explained hereinafter, the driver trainer may be alternatively operated in an automatic or a manual mode. In the automatic mode, the motion picture projected by the projector 18 provides to the students a realistic view of a roadway. The students' performance of vehicular functions in response to the roadway view include the manipulation of the controls of the simulator cars 14. When a student's response is erroneous, an indication thereof is provided at a display on the one of the simulator cars 14 where the error is made. The instructor may request the performance of vehicular functions by the students in addition to those provided in response to the filmed roadway view.

In the manual mode, the instructor may request the performance of a selected one of a plurality of responses by the student. The slide projector 19 may be utilized by the instructor to provide the subject matter of questions which the students are asked. The instructor, if he chooses, may have an indication of correct and erroneous responses provided to the students in the simulator cars 14.

AUTOMATIC MODE

Figure 2:
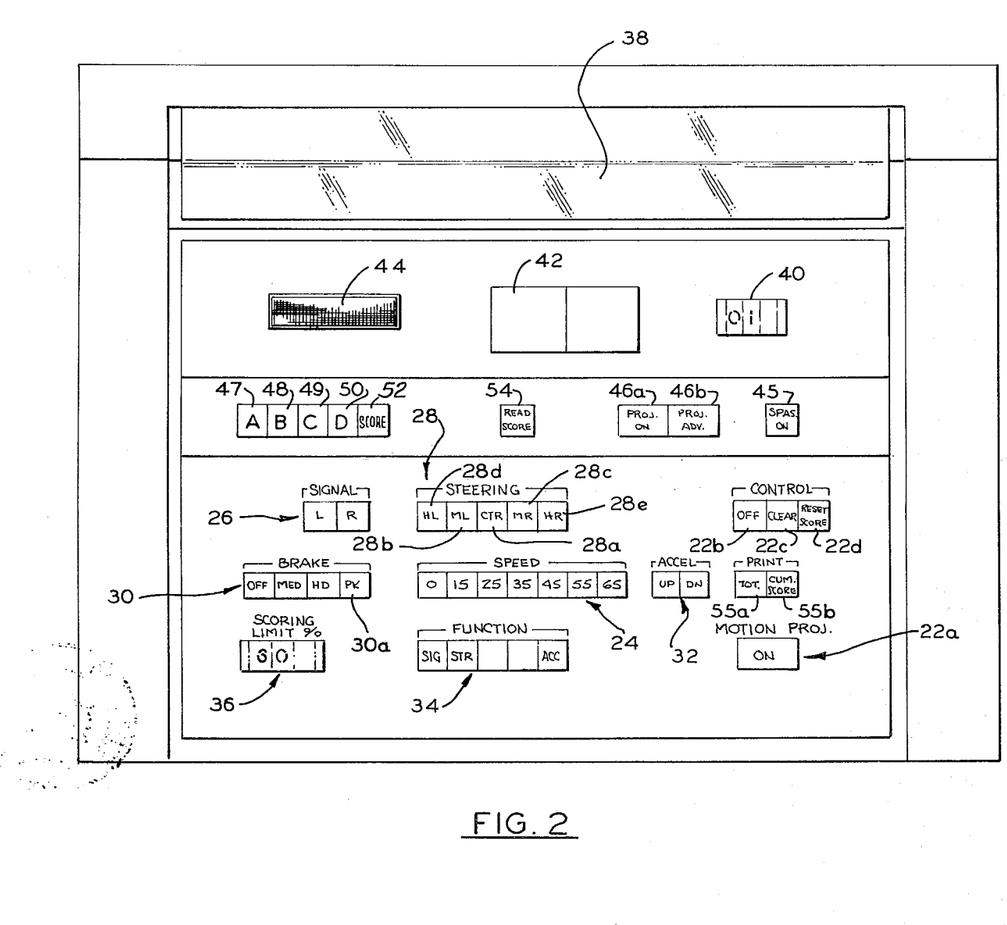
FIG. 2 is a top plan view of the instructor's console included in the preferred embodiment of FIG. 1.

Referring now to FIG. 2, the automatic mode of the driver trainer system is initiated by releasing a CODE OFF pushbutton on the console 12; a motion picture projection push button is depressed to start the motion picture projector 18. In response thereto the projector 18 projects the motion picture upon the screen 20 as described hereinbefore.

In correspondence with the display of the subject matter of the film, binary coded signals from the film are provided to the console 12 via the mini-computer and the interface circuits. The binary codes are representative of a desired performance of a vehicular function by the students within the simulator cars 14 (FIG. 1).

The vehicular functions of interest may, for example, include turn signalling, the controlling of a simulated acceleration, the controlling of a simulated speed, steering and braking. Actual performance of the vehicular functions is accomplished in each of the simulator cars 14 by the manipulation of the following controls: a turn indicator, a steering wheel, brakes and an accelerator pedal. The correct performance of a vehicular function provides either a desired turn indicator position, a desired orientation of the steering wheel, a desired indicated speed of the simulator cars 14, a desired status of brakes or a desired position of the accelerator.

Referring again to FIG. 2, associated with the speed function are speed push buttons 24 which have respectively provided thereon numerals indicative of a desired indicated speed of the simulator cars 14. In response to binary coded signals representative of a desired indicated speed, one of the push buttons 24 becomes illuminated thereby providing an indication of the desired indicated speed.

In a similar manner, associated with the signal function are a pair of turn indicator push buttons 26 which have respectively provided thereon the words, LEFT and RIGHT. In response to binary coded signals representative of a desired position of the turn indicators, one of the push buttons 26 becomes illuminated, thereby providing an indication of a desired position.

Associated with the steering function are steering push buttons 28 which have respectively provided thereon letters indicative of a desired orientation of the steering wheels. In this embodiment, the letters, CTR, are provided on a push button 28a whereby the illumination of the push button 28a is indicative of the desired orientation of the steering wheels in their center position. Similarly, letters ML and MR are respectively provided on push buttons 28b, 28c whereby the illumination of the push buttons 28b, 28c are indicative of respective desired orientations of the steering wheels in medium left and medium right turning positions. Additionally, the letters, HL and HR, are respectively provided on push buttons 28d, 28e whereby the illumination of the push buttons 28d, 28e are indicative of respective desired orientations of the steering wheels in hard left and hard right turning positions. In response to binary coded signals representative of a desired orientation of the steering wheels, one of the push buttons 28 becomes illuminated, thereby providing an indication of a desired orientation.

Associated with the braking function, are a plurality of brake push buttons 30 which have respectively provided thereon letters indicative of a desired status of the brakes. The word, PARK, is provided on a push button 30a whereby the illumination of the push button 30a is indicative of the desired status of respective parking brakes of the simulator cars 14 being "on." Similarly, the word, HARD, and the letters, MED, are respectively provided on push buttons 30b, 30c whereby the illumination of the push buttons 30b, 30c are indicative of respectively desired hard and medium application of respective foot brakes in the simulator cars 14. Additionally, the word, OFF, is provided on a push button 30d whereby the illumination of the push button 30d is indicative of no application of the foot brakes being desired. In response to binary coded signals representative of a desired status of the brakes, one of the push buttons 30 becomes illuminated thereby providing an indication of a desired braking status.

Associated with the acceleration function, a pair of accelerator push buttons 32 have respectively provided thereon the words, UP and DOWN. In response to binary coded signals representative of a desired change of the desired indicated speed, one of the push buttons 32 becomes illuminated thereby providing an indication of a desired position of the accelerator pedal.

It should be understood that the desired performance of vehicular functions may be manually provided to the mini-computer. The manually inserted desired performance must not be associated with the same function as a binary code simultaneously provided by the film. During an interval when, for example, the film does not provide the binary coded signal representative of a braking status, the push button 30b may be depressed thereby causing the illumination thereof and also initiating a desired hard application of the foot brakes.

A plurality of function push buttons 34, grade trend indicator thumbwheel switches 36, and an instructor display 38 having a plurality of lamps therein are used to provide a grade trend indication of the ability of students to correctly perform a selected vehicular function. In correspondence with the vehicular functions, the function push buttons 34 which serve as vehicular function selection means include: a signal push button 34a with the letters, SIG, provided thereon; a steering push button 34b with the letters, STR, being provided thereon; a braking push button 34c with the letters, BRK, being provided thereon; a speed push button 34d with the letters, SPD, being provided thereon; and an accelerator push button 34e with the letters, ACC, being provided thereon. The switches 36 which serve as percentile number selection means may be set to provide a numerical readout and a grade trend signal to the mini-computer representative of a selected percentile number in a range from zero to 95. Typically, the switches 36 provide numbers with an incremental separation of five. In response to one of the function push buttons being depressed, it becomes illuminated and provides a selection signal representative of said selected function to the mini-computer. The computer, in a conventional and well-known fashion, calculates, for each simulator motor vehicle, the percentage of correct performances of the selected function (i.e., a ratio of the number of correct performances to the total number of performance checks for that function) and compares this percentage with the selected percentile number. In response to this comparison segmented display lamps within the display 38 become illuminated thereby providing on the display 38 the numerical designations of the simulator cars 14 where a percentage of correct performances of the selected function is less than the selected percentile number.

MANUAL MODE

When the push button 22a is not depressed, (the projector 18 is off) desired function indications are provided to the mini-computers by manually depressing push buttons indicative of the desired response of the students. Typically, an instructor verbally requests a desired response from the students and then depresses one or more push buttons indicative of the desired response. Alternatively, a push button 22b, which has the letters, CODE OFF, provided thereon may be depressed to inhibit the provision of binary codes by the film in the projector 22 whereby all binary codes are provided manually.

It should be understood that in the manual mode, the push buttons 34, the switches 36 and the display 38 may be used to provide a grade trend indication as described hereinbefore.

Associated with the slide projector 19 are push buttons 45, 46a which have the letters, SPRS ON, and, PROJ ON, respectively provided. The slide projector 19 is turned on in response to the depression of the push button 45. A successive slide is projected on the screen 18 in response to the depression of a projector advance push button 46b which has the letters, PROJ ADV, provided thereon. Slide projection and apparatus for projecting successive slides is well known in the art and, hence, not described hereinafter.

When a slide image is provided on the screen 20, the instructor may ask a multiple-choice question where the answer is indicated by respective selections by the students of one of the letters A, B, C and D. Provided on the console 12 are four answer push buttons 47–50 where the letters A through D are respectively provided. After the instructor asks a question, the correct response thereto is provided to the mini-computer by the instructor depressing one of the push buttons 47–50. Additionally provided on the console 12 is a push button 52 having the word, SCORE, provided thereon. After allowing the students time to respond to the question, the instructor depresses the push button 52 thereby causing the transmission of a signal representation of the student's answer to the mini-computer via the cable 21 and the interface circuits; a representation of the student's answer is stored within the mini-computer.

A grade trend indication of the student's response to the multiple-choice questions is provided on the display 38 in response to the setting of the thumb wheel switches 36 to the selected percentile and the depression of a push button 54 having the words, READ SCORE, provided thereon.

Common to both the automatic and the manual modes, displayed on the console 12 are the vehicular functions actually performed in a selected one of the simulator cars 14. In response to setting car designation thumbwheel switches 40 to the numerical designation of one of the simulator cars 14, indications associated therewith of the brake status, accelerator position, orientation of the steering wheel and turn indicator position are all provided on a single student display 42; the indicated speed is provided on a meter 44. The display 42 has a plurality of segmented display lamps therein which are selectively illuminated to provide the indication referred to hereinbefore.

The depression of a control push button 22c having the words, CODE CLEAR, provided thereon, causes the termination of desired responses previously provided by either the film or the push buttons as described hereinbefore.

In response to the depression of a push button 22d having the words, RESET SCORE, provided thereon, the minicomputer clears from the storage therein all signal representations related to prior responses of the student.

Associated with the keyboard 16 are push buttons 55a, 55b having the words, TOTAL, and, CUM SCORE, respectively provided thereon. In response to the depression of the push button 55a, the keyboard 16, which may, for example, be a Teletype Printer — model ASR 33, automatically provides a printed copy specifying the number of errors in the performance of each of the vehicular functions in the simulator cars 14, respectively. Additionally, the average number of correct responses within the cars 14 respectively, is provided.

In response to the depression of the push button 55b, more detailed information regarding the student's performance may be provided from the mini-computer via the interface circuits and the keyboard 16. The keyboard 16 may also provide signals which are stored within the computer. Typically, stored are the names of students and the number of classes they previously attended. The use of printer keyboards to provide hard copies and provide signals as described hereinbefore is well known and therefore not described hereinafter.

SIMULATOR CARS

Referring to FIG. 1, each of the simulator cars 14 are comprised of a seat 56 wherein a pair of backup mirrors 58 are mounted. A student, therefore, may view a motion picture or a slide image projection on the screen 20 and thereby learn manipulative skills associated with driving a motor vehicle backwards.

Figure 3:
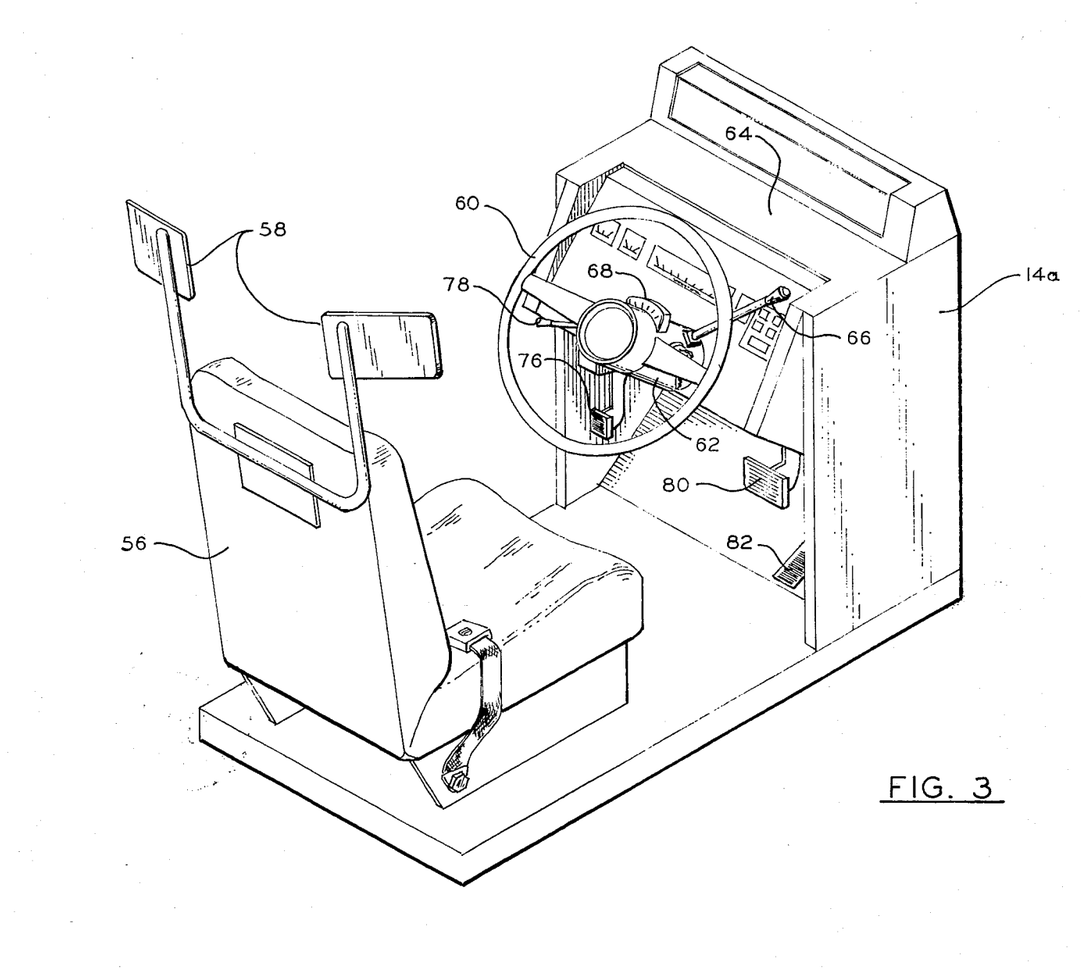
FIG. 3 is a perspective view of a simulator car included in the preferred embodiment of FIG. 1.
Figure 4:
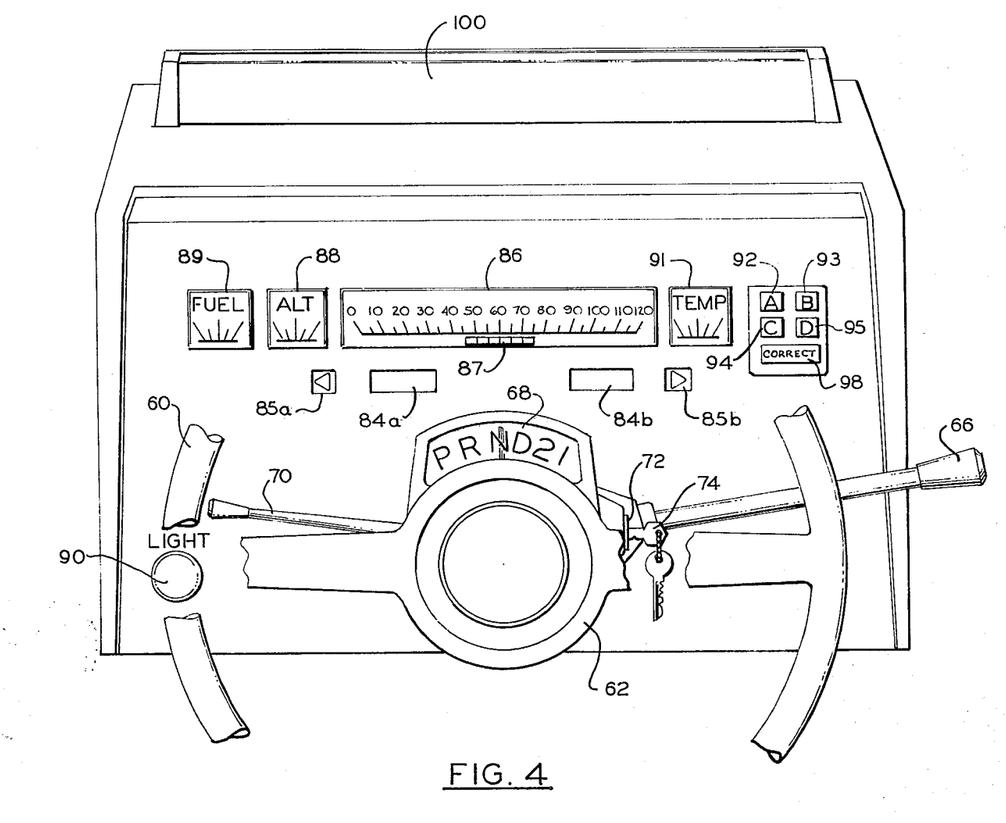
FIG. 4 is a front elevation with parts broken away, of the steering wheel and instrument panel of the simulator car illustrated in FIG. 3.

Referring now to FIGS. 3 and 4 the seat 56 of a simulator car 14a is disposed with respect to simulated controls in substantially the same manner a driver's seat is disposed with respect to controls of a motor vehicle. The simulated controls are comprised of a steering wheel 60 mounted upon a steering column 62 which is supported within an instrument panel 64.

The steering wheel 60 (FIG. 4) is connected to a rotary steer switch (not shown) mounted within the steering column 62. Switch contact closures of the steer switch are provided in response to the rotation of the steering wheel 60. Rotations from a center position thereof to the left and to the right of less than 16°, more than 16° but less than 304° and more than 304° are respectively associated with the center, medium left and medium right, and hard left and hard right positions of the steering wheel 60. The connection of the contacts of the steer switch is described hereinafter.

Additionally, mounted on the steering column 62 are a transmission level 66 and a transmission status indicator 68 which indicates the position of the lever 66. Transmission levers and transmission status indicators are well known to anyone who has driven a motor vehicle with an automatic transmission.

The transmission lever 66 is connected to a rotary transmission switch (not shown) mounted within the steering column 62. Switch contact closures of the transmission switch are provided in response to the transmission lever being in neutral, reverse, drive, L1, L2, and park positions, respectively.

Additionally mounted on the steering column 62 are a turn signal lever 70 and an ignition keyhole 72 wherein an ignition key 74 may be inserted. Turn signal levers, ignition keyholes and ignition keys are well known in the automotive art.

The turn signal lever 70 is part of a turn signal assembly of a type commonly used in motor vehicles. The turn signal assembly includes a turn signal switch with a pair of switch closures thereof being provided in response to the turn signal lever 70 being moved to signal a left and a right turn, respectively.

In a similar manner, the ignition keyhole 72 is connected to a rotary ignition switch (not shown) mounted within the steering column 62. Switch contact closures of the ignition switch are provided in response to the ignition keyhole being in on, off and start positions, respectively.

Provided below the panel 64 are a foot actuated parking brake pedal 76 (FIG. 3) and a parking brake release lever 78, a brake pedal 80 and an accelerator pedal 82. The pedals 76, 80, 82 and the lever 78 all simulate corresponding well known controls in motor vehicles.

The accelerator pedal 82 is a part of an accelerator assembly which extends below the floor of the simulator car 14a where an accelerator potentiometer is mounted. The accelerator potentiometer is connected to provide a voltage proportional to the depression of the accelerator pedal 82 as explained more fully hereinafter.

The brake pedal 80 is part of a brake assembly which extends below the floor of the simulator car 14a. The brake assembly is spring loaded by a spring (not shown) to provide a reaction force to the brake pedal similar to that of a typical brake pedal in a motor vehicle. Additionally, the brake assembly is connected to a cam operated switch (not shown) mounted below the floor of the simulator car 14a. Switch contact closures of the cam switch are provided in response to the brake pedal being in the medium and in the hard braking positions. The parking brake being in the "on" position causes that closure of the switch indicative of hard braking.

Set within the panel 64 is an instrument cluster typical of those found on the instrument panel of a motor vehicle. The instrument cluster is comprised of a functional group and a non-functional group. The functional group includes an oil warning light 84a, a parking brake light 84b, a pair of turn signal flasher lamps 85a, 85b, and a speedometer 86.

The speedometer 86 provides to the student the indicated speed of the simulator car 14a. The apparatus for providing excitation to the light 84 and the speedometer 86 is described hereinafter.

In a manner substantially the same as in a motor vehicle the flashing of the turn signal flasher lamps 85a, 85b indicate the turn signal lever 70 being respectively in downward and upward positions with respect to a center position thereof.

The oil warning light 84a is illuminated in response to the key 74 being turned to the "on" position within the keyhole 72 when the controls of the simulator car 14a have not been manipulated to simulate operations necessary to start the engine of a motor vehicle.

The parking brake light 84b is illuminated in response to the actuation of the brake pedal 76.

The non-functional group includes an odometer 87, an alternator indicator 88, a fuel gauge 89, a headlight switch 90, and a temperature gauge 91, all of which are well known. The non-functional group is to realistically simulate the appearance of the instrument cluster of a motor vehicle.

Mounted upon the control panel 64 are response push buttons 92–95 which have the letters, A–D, respectively provided thereon. When the instructor asks a multiple-choice question as described hereinbefore, the student responds by depressing one of the push buttons 92–95 thereby causing contacts of the one of the push buttons 92–95 to close. Below the push buttons 92–95 is an indicator lamp 98 with the word, CORRECT, provided thereon. In response to the student depressing the one of the push buttons 92–95 corresponding to a correct answer to a multiple-choice question, the lamp 98 is illuminated.

Above the panel 64 is a student feedback display 100 where errors in the performance of vehicular functions within the simulator car 14a are indicated to the student. In addition to the functions referred to hereinbefore, the display 100 provides the words, CAR OFF, when either the ignition key 74 is within the keyhole 72 in an "OFF" position or the simulated engine of the simulator car 14a is stalled. Within the display 100 are provided lamps (not shown) for indicating the words, "CAR OFF," and errors in the performance of vehicular functions.

SIMULATOR CARS

Detailed Description

Figure 5:
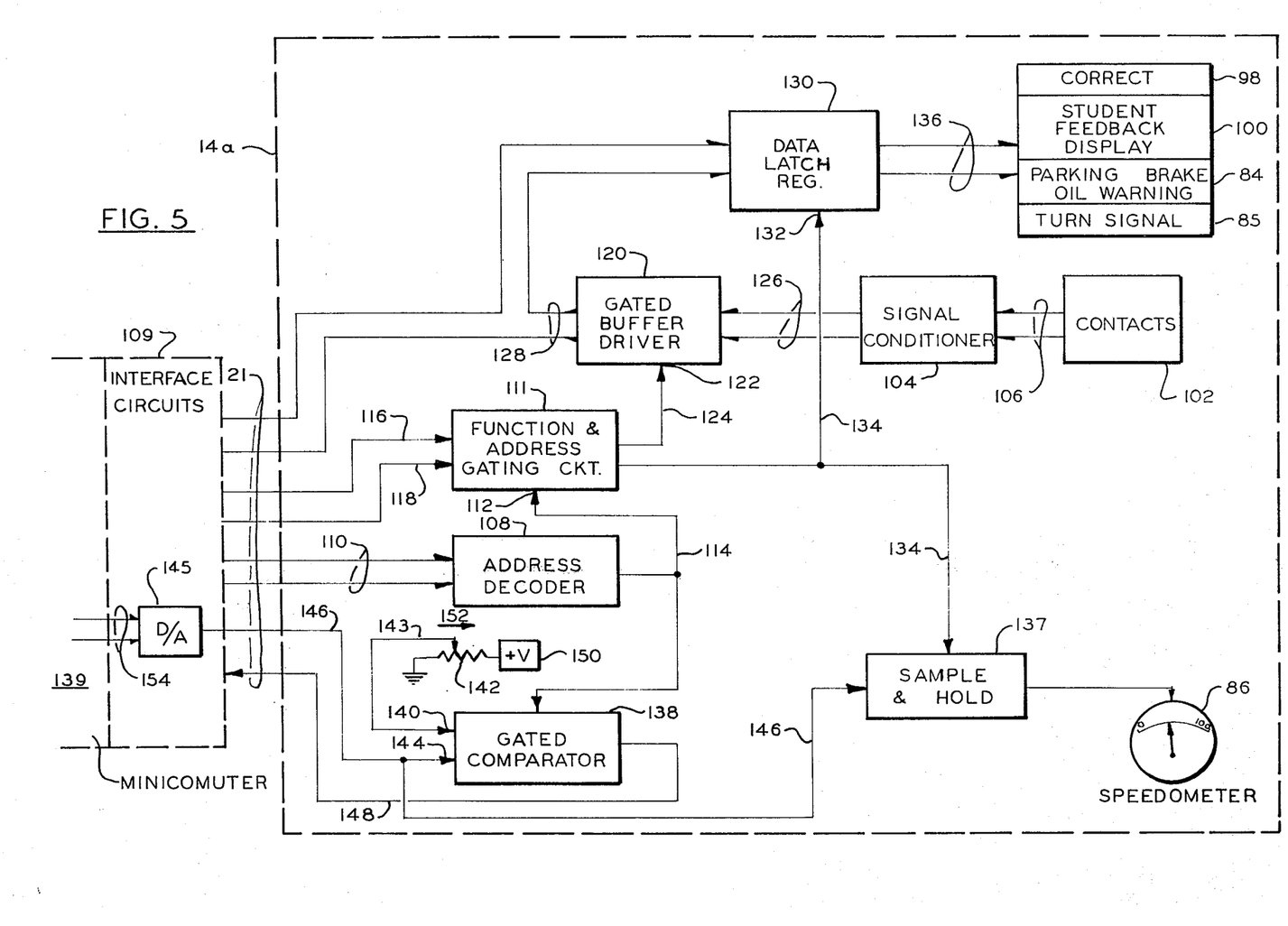
FIG. 5 is a schematic block diagram of the circuitry within the simulator car illustrated in FIG. 3.

Referring now to FIG. 5, contacts of the steer switch, the transmission switch, the turn signal switch, the ignition switch, the cam switch and the push buttons 92–95 are collectively referred to by the reference number 102 and connected to a signal conditioner circuit 104 through a plurality of signal lines 106. The signal conditioner 104 provides a logic voltage of approximately 3.5 volts (referred to as, ONE, hereinafter) at outputs respectively associated with closed switch contacts; at outputs respectively associated with unclosed switch contacts a logic voltage substantially equal to ground (referred to as, ZERO, hereinafter) is provided. In this embodiment, ONE's and ZERO's are each the logical inverse of the other and are collectively referred to as logic signals.

As explained hereinafter, contact logic signals associated with the openings and closures of the contacts 102 are provided to the mini-computer in concurrent response to an address code and a signal conditioner gating logic signal being provided by the mini-computer.

An address decoder 108 is connected to interface circuits 109 through a plurality of signal lines 110 included in the cable 21. The interface circuits 109 provide to the decoder 108 device address signals respectively associated with the console 12 and simulator cars 14. In response to the device address signals, the decoder 108 provides simulator car identification logic signals. ONE is the identification logic signal provided in response to the device address signal associated with the simulator car 14a. It should be understood that device signals respectively associated with the console 12 and the simulator cars 14 are provided periodically.

The output of the decoder 108 is connected to a function and address gating circuit 111 at a gating input 112 thereof through a signal line 114. Additionally connected to the gating circuit 111 at logic signal inputs thereof are the interface circuits 109 through signal lines 116, 118. A signal conditioner gating logic signal and an input gating logic signal are provided by the interface circuits 109 through the lines 116, 118, respectively. In this embodiment, the signal conditioner and input gating logic signals are alternately ONE while the identification logic signal is ONE.

In response to the signal conditioner gating and the identification logic signals both being ONE, the gating circuit 111 provides ONE to a gated buffer driver 120 at a gating input 122 thereof through a signal line 124.

Logic signal inputs of the driver 120 are connected to the output of the signal conditioner 104 through a plurality of signal lines 126. In response to ONE being provided at the input 122, the buffer driver provides contact logic signals which are respectively the inverse of the outputs of the signal conditioner. The contact logic signals are provided to the interface circuits 109 through a plurality of signal lines 128 included in the cable 21.

In response to the input gating and the identification logic signals both being ONE, the gating circuit 111 provides ONE to a data latch register 130 at a gating input 132 thereof through a signal line 134.

Logic signal inputs of the register 130 are connected to the lines 128 whereby lamp selection logic signals are provided from the interface circuits 109 to the register 130. The outputs of the register 130 are connected to the lamps 84, 85, 98 and the lamps in the display 100 through a plurality of signal lines 136. In response to ONE being provided at the input 132, the register 130 stores the lamp selection logic signals and provides excitation to selected ones of the lamps 84, 85, 98 and the lamps in the display 100, the selection being in accordance with the logic signals provided by the register 130.

The speedometer 86 is a meter of any suitable type where the deflection of a pointer thereof is in proportion to a speed voltage. The speed voltage is provided through a sample and hold network 137 to the speedometer 86 by a minicomputer 139 in response to logic signals representative of the depression of the accelerator pedal 82, the brake status, position of the ignition key 72, and the position of the transmission lever 66.

In providing logic signals representative of the depression of the accelerator pedal 82, the decoder 108 is connected to a gated comparator 138 through the line 114. A first input 140 and a second input 144 of the comparator 138 are respectively connected to an accelerator potentiometer 142 at a wiper arm 143 thereof and the interface circuits 109 through the signal line 146 included in the cable 21. The output of the comparator 138 is connected to the computer 139 via the interface circuits 109 through a signal line 148 included in the cable 21.

Included in the interface circuits 109 is a digital-to-analog converter 145, the output thereof being connected to the input 144. In response to the identification logic signal being ONE and the signal provided by the wiper arm 143 being greater than the signal provided by the D/A converter 145, ONE is provided at the output of the gated comparator 138; when the signal provided by the D/A converter 145 is greater than the signal provided by the wiper arm 143, ZERO is provided at the output.

The potentiometer 142 has one end connected to a voltage source (+V) 150 and the other end connected to ground. In response to the depression of the accelerator pedal 82, the wiper arm 143 moves in a direction indicated by the arrow 152 whereby an accelerator voltage is provided at the input 140 in proportion to the depression of the accelerator pedal 82.

As explained hereinafter, the D/A converter 145 causes the computer 139 to provide a logic signal representation of the accelerator voltage. Additionally, the D/A converter 145 is utilized to provide the speed voltage.

The D/A converter 145 provides a voltage proportional to a logic signal representation provided thereto by the computer 139 through a plurality of signal lines 154. Logic signals representative of a first approximation voltage substantially equal to one-half of the voltage provided by the source (+V) 150 are provided on the lines 154 whereby a corresponding voltage is provided by the D/A converter 145. In response to the comparator 138 providing ONE (the voltage provided by the D/A converter 145 being less than the accelerator voltage) logic signals representative of a second approximation voltage substantially equal to three quarters (½ + ¼) of the voltage of the source (+V) 150 are provided on the lines 154; ZERO causes the provision of logic signals representative of a second approximation voltage substantially equal to one-quarter of the voltage of the source (+V) 150. Similarly, logic signals representative of a third approximation voltage are provided to cause the output of the D/A converter 145 to increase by one-eighth of the voltage of the source (+V) 150 whereby the comparator 138 responds to cause the provision of a fourth approximation voltage.

In the preferred embodiment there are eight approximation voltages successively provided in a manner analogous to that described hereinbefore, the eighth approximation voltage being a close approximation of the accelerator voltage. Therefore, when the eighth approximation voltage is provided, the lines 156 provide thereon a logic signal representation of a close approximation of the accelerator voltage. The provision of the approximation voltages is in accordance with analog-to-digital conversion techniques which are well known in the prior art.

In response to the logic signal representation of the accelerator voltage and signals representative of the brake status, position of the ignition key 72 and the position of the transmission lever 66, a logic signal representation of the speed voltage is provided on the lines 154 to the D/A converter 145. In response thereto, the D/A converter 145 provides a speed voltage to a data input of the sample and hold network 137. Simultaneously with the provision of the speed voltage, ONE is provided on the lines 112, 118 thereby causing the provision of ONE to an enabling input of the sample and hold circuit 137 through the signal line 134. In response to ONE on the line 134, the voltage provided by the D/A converter 145 is fed through the sample and hold network 137 to the meter 86. The voltage fed to the meter 86 is also stored by the sample and hold network 137. In response to ZERO on the line 134, the voltage stored by the sample and hold network 137 is fed to the meter 86 whereby changes in the voltage provided by the D/A converter 145 are not fed through or stored by the sample and hold network 137.

INSTRUCTOR'S CONSOLE

Detailed Description

Figure 6:
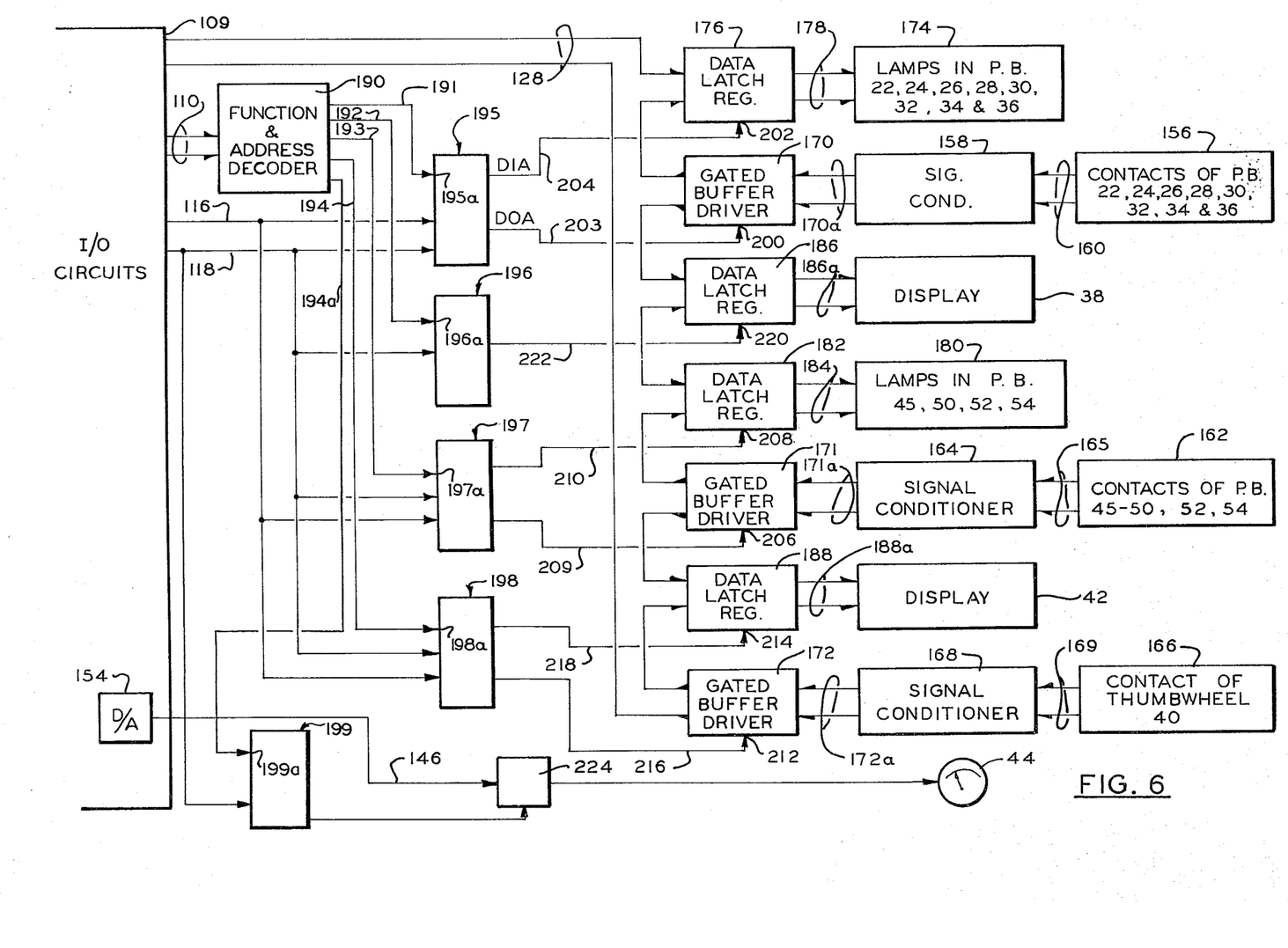
FIG. 6 is a schematic block diagram of the circuitry within the instructor's console included in the preferred embodiment of FIG. 1.

Referring now to FIG. 6, contacts of the push buttons 22, 24, 26, 28, 30, 32, 34, and the contacts of the thumbwheel switch 36 are collectively referred to by the reference number 156 and connected to a signal conditioner 158 similar to the signal conditioner 104 (FIG. 4). Accordingly, logic signals are provided indicative of the closure and opening of the contacts 156.

In a similar manner, the contacts of the push buttons 45–50, 52, 54 are collectively referred to by the reference number 162 and connected to a signal conditioner circuit 164 through a plurality of signal lines 165. The signal conditioner 164 is similar to the signal conditioner 104 whereby logic signals are provided indicative of the closure and the opening of the contacts 162.

Similarly, the contacts of the thumbwheel switches 40 are collectively referred to by the reference number 166 and connected to a signal conditioner circuit 168 through a plurality of signal lines 169. The signal conditioner 166 is similar to the signal conditioner circuit 104 whereby logic signals are provided indicative of the closure and opening of the contacts 166.

The signal conditioners 158, 164, 168 are respectively connected to logic signal inputs of buffer drivers 170–172 through signal lines 170a, 171a, 172a. The buffer drivers 170–172 are similar to the buffer driver 120 described hereinbefore (FIG. 4).

The lamps within the push buttons 22, 24, 26, 28, 30, 32 are collectively referred to by the reference number 174 and respectively connected to the outputs of a data latch register 176 through a plurality of signal lines 178. In a similar manner, the lamps within the push buttons 48–50, 52, 54 are collectively referred to by the reference number 180 and connected to a data latch register 182 through a plurality of signal lines 184. The registers 176, 182 are similar to the register 130 described hereinbefore (FIG. 9).

The lamps within the displays 38, 42 are connected to data latch registers 186, 188 through signal lines 186a, 188a respectively. The registers 186, 188 are similar to the register 130 referred to hereinbefore.

The drivers 170–172 and the registers 176, 182, 186, 188 are all connected to the interface circuits 109 via the signal lines 128. As explained hereinafter, contact logic signals associated with the contacts 156, 162, 166 are provided to the interface circuits 109 through the lines 128; lamp logic signals associated with the lamps 174, 180 and the displays 38, 42 are provided to the registers 176, 182, 186, 188 from the interface circuits 109 through the lines 128.

The interface circuits 109 are connected to a function and address decoder 109 through the lines 110. In response to the device address signals provided by the interface circuits 109, the decoder 190 provides alternately and periodically ONEs on signal lines 191–194, 194a which are respectively connected to function and address gating circuits 195–199, at gating inputs 195a – 199a thereof. Accordingly, the decoder 190 is equivalent to four of the decoder 108 (FIG. 4) which respectively provide logic signals on the lines 190–194.

The gating circuits 195, 197, 198 have logic signal inputs connected for the application of the signal conditioner gating logic signal and the input gating logic signal through the lines 116, 118, respectively. The gating circuits 195, 197, 198 are all similar to the gating circuit 111 described hereinbefore (FIG. 5).

Outputs of the gating circuit 195 are respectively connected to a gating input 200 of the driver 170 and a gating input 202 of the register 176 through signal lines 203, 204. In concurrent response to the signal conditioner gating logic signal being ONE and ONE being provided on the line 191, contact logic signals representative of the openings and closures of the contacts 156 are provided on the lines 128. In concurrent response to the input gating logic signal being ONE and ONE being provided on the line 191, lamp selection logic signals are provided from the interface circuits 109 to the register 176 causing illumination of selected ones of the lamps 174.

Outputs of the gating circuit 197 are respectively connected to a gating input 206 of the driver 171 and a gating input 208 of the register 182 through signal lines 209, 210, respectively. In concurrent response to the signal conditioner logic gating signal being ONE and ONE being provided on the line 193, contact logic signals representative of the openings and closures of the contacts 162 are provided on the lines 128. In concurrent response to the input gating logic signal being ONE and ONE being provided on the line 193, lamp selection logic signals are provided from the interface circuits 109 to the register 182 causing illumination of selected ones of the lamps 180.

Outputs of the gating circuit 198 are respectively connected to a gating input 212 of the driver 172 and a gating input 214 of the register 188 through signal lines 216, 218, respectively. In concurrent response to the signal being ONE and ONE being provided on the line 194, the contact logic signals representative of the openings and closures of the contacts 166 are provided on the lines 128. In concurrent response to the input gating logic signal being ONE and ONE being provided on the line 194, lamp selection logic signals are provided from the interface circuits 109 to the register 188 causing illumination of selected ones of the lamps in the display 42.

The input gating logic signal is connected through the line 118 to a logic input of the gating circuit 196. The output of the gating circuit 196 is connected to a gating input 220 of the register 186 through a signal line 222. In concurrent response to the input gating logic signal of ONE and ONE being provided on the line 192, ONE is provided to the gating input 220 whereby lamp selection logic signals are provided from the interface circuits 109 to the register 186 causing illumination of selected ones of the lamps in the display 38.

The output of the gating circuit 199 is connected to an enabling input of a sample and hold network 224. In concurrent response to the input gating logic signal being ONE and ONE provided on the line 194a, ONE is provided to the sample and hold network 224. The sample and hold network 224 (similar to the sample and hold network 137 (FIG. 5) has a data input connected to the output of the digital-to-analog converter 154 through the line 146. Therefore, in response to ONE being provided by the gating circuit 199, the voltage provided by the D/A converter 145 is fed through the sample and hold network 224 to the meter 44.

INTERFACE CIRCUITS

Figure 7:
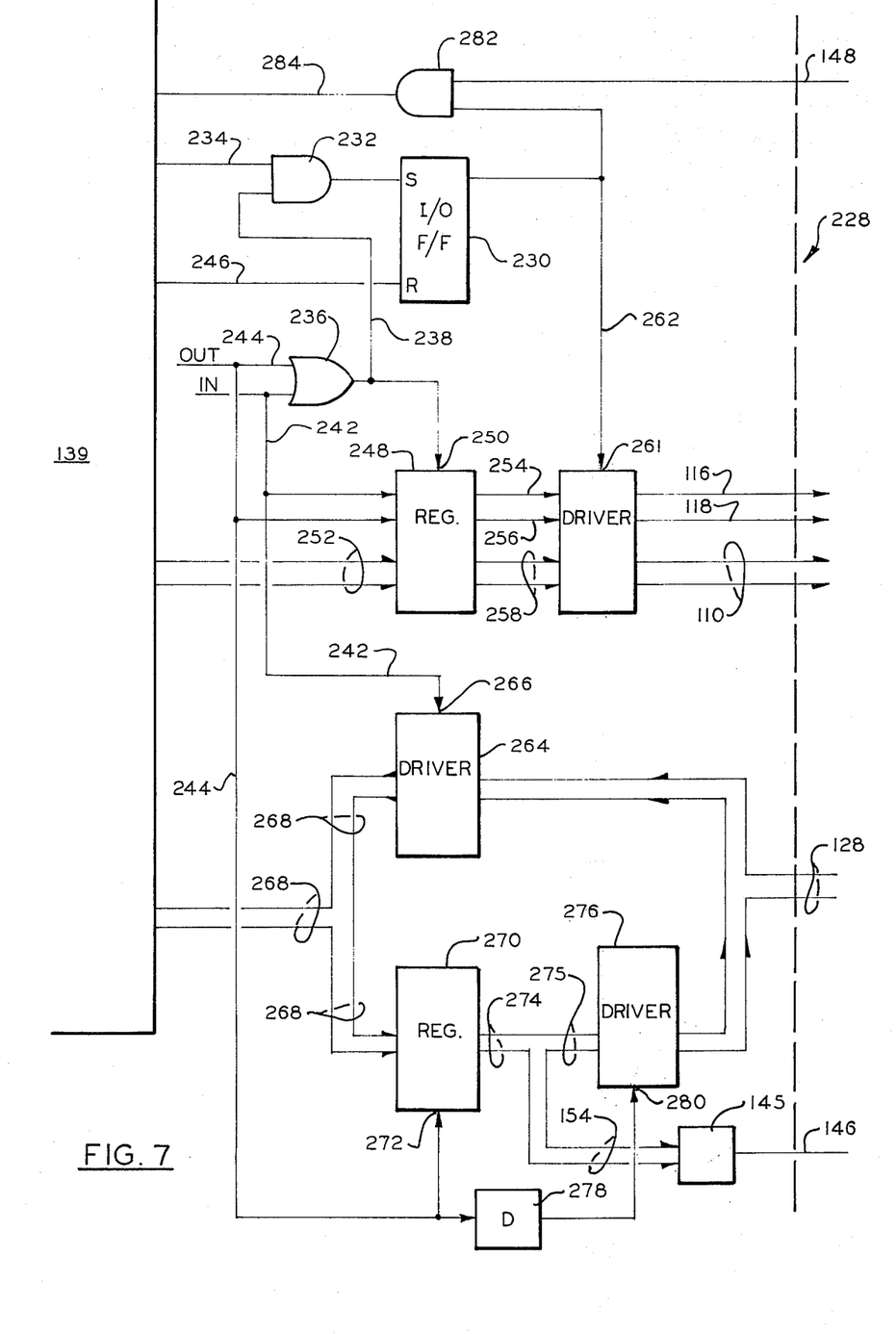
FIG. 7 is a schematic block diagram of a console interface circuit in the pedestal cabinet included in the preferred embodiment of FIG. 1.

Referring now to FIG. 7, included in the interface circuits 109 is a car and console interface circuit 228 where the signals described hereinbefore are provided to and received from the console 12 and the simulator cars 14.

The circuit 228 is comprised of an input/output flip-flop 230 which is conditioned to provide ONE in response to ONE being provided at a set input thereof; ZERO is provided in response to ONE being provided at a reset input. The flip-flop 230 is of a type well known in the digital circuit art. As explained hereinafter, when ONE is provided at the output of the flip-flop 230, the signal conditioner gating logic signal, the input gating logic signal and the car logic signals are respectively provided through the signal lines 116, 118, 110.

The set input of the flip-flop 230 is connected to the output of an AND gate 232 which has one of two inputs, one of which is connected to the computer 139 through a signal line 234 and the other is connected to the output of an OR gate 236 through a signal line 238. The AND gate 232 provides ONE in concurrent response to ONE being provided at the inputs thereof. The AND gate 232 is of a type well known in the digital circuit art.

The computer 139 provides a car and console address logic signal through the line 234 whereby ONE is provided at the output of the AND gate 232 in concurrent response to the car and console address logic signal being ONE and ONE being provided by the OR gate 236. The car and console address logic signal is provided in accordance with the programming of the computer 139.

The OR gate 236 has a pair of inputs which are connected to the computer 139 through signal lines 242, 244, respectively. ONE is provided at the output of the OR gate 236 in response to ONE being provided at an input thereof. The OR gate 236 is of a type well known in the digital circuit art.

The computer 139 provides IN and OUT logic signals through the lines 242, 244, respectively, whereby ONE is provided by the OR gate 236 in response to either the IN or the OUT logic signals being ONE. Accordingly, ONE is provided at the set input of the flip-flop 230 in response to the IN or the OUT logic signals being ONE concurrently with the car and console address logic signal being ONE.

The reset input of the flip-flop 230 is connected to the computer 139 through a signal line 246 whereby an input/output reset logic signal is provided to the flip-flop 230. In response to the reset logic signal being ONE, the flip-flop 230 provides ZERO at the output thereof, thereby inhibiting signals from being received from or provided to the console 12 and the simulator cars 14 as explained hereinafter. The reset logic signal is provided in accordance with the programming of the computer 139.

The output of the OR gate 236 is connected to a data latch register 248 at a gating input 250 thereof. The register 248 is similar to the register 130 described hereinbefore (FIG. 5). Logic inputs of the register 248 are connected to the computer 139 through the lines 242, 244 and a plurality of signal lines 252 whereby IN, OUT and computer car logic signals are respectively provided to the register 248. In response to either the IN or the OUT logic signals being ONE, the IN, OUT and computer car logic signals are stored and respectively provided by the register 248 on signal lines 254, 256, and a plurality of signal lines 258.

The register 248 is connected to logic inputs of a gated buffer driver 260 through the lines 254, 256, 258. The driver 260 is similar to the driver 120 (FIG. 5) referred to hereinbefore. A gating input 261 of the driver 260 is connected to the output of the flip-flop 230 through a signal line 262. In response to the flip-flop 230 providing ONE, the output of the register 248 is provided through the driver 260 and through the lines 110, 116, 118 whereby the car logic signals, the signal conditioner logic gating signal and the input gating logic signal are provided to the console 12 and the simulator cars 14.

The IN logic signal is provided to a gated buffer driver 264 at a gating input 266 thereof. The driver 264 is similar to the driver 120 (FIG. 5) referred to hereinbefore. Logic inputs of the driver 264 are connected to the lines 128 whereby the contact logic signals are provided to the driver 264. The output of the driver 264 is connected to the computer 139 through a plurality of signal lines 268. In response to the IN logic signal being ONE, the contact logic signals are provided through the driver 264 to the computer 139. The contact logic signals are provided in accordance with the device address logic signals in response to the signal conditioner gating logic signal being ONE. It should be understood that in response to the signal conditioner logic gating signal being ZERO, logic signals are not provided to the driver 264.

The OUT logic signal is provided through the line 244 to a data latch register 270 at a gating input 272 thereof. Logic inputs of the register 270 are connected to the computer 139 through the lines 268 whereby computer lamp selection logic signals and a logic signal representation of the accelerator voltage are provided to the register 270. In response to the OUT logic signal being ONE, the computer lamp selection signals and the logic signal representation of an accelerator voltage are stored by the register 270 and provided thereby on a plurality of signal lines 274. The register 270 is connected to logic inputs of a gated buffer driver 276 through a plurality of signal lines 275 included in the lines 274 whereby the lamp selection logic signals are provided to the driver 276. The driver 276 is similar to the driver 120 (FIG. 5) referred to hereinbefore.

The OUT logic signal is provided through a delay network 278 to a gating input 280 of the driver 276. In response to the OUT logic signal being ONE, at a known time thereafter ONE is provided at the output of the delay network 278. The delay network 278 may be a one-shot multivibrator or any other suitable network. In response to the delay network 278 providing ONE, the lamp selection logic signals are provided through the driver 276 and through the lines 128 to the console 12 and the simulator cars 14. The delay network 278 provides time for the register 270 to store the lamp selection logic signals before providing ONE to the gating input 280.

The lines 274 include the lines 154 which are connected to the D/A converter 145 as described hereinbefore.

The output of the flip-flop 230 is connected to one of two inputs of an AND gate 282 (similar to the AND gate 232), the other input being connected to the gated comparators in the simulator cars 14 through the signal line 148. The output of the AND gate 282 is connected to the computer 139 through a signal line 284 whereby the output of the gated comparators is provided to the computer 139 in response to the flip-flop 230 providing ONE.

Figure 8:
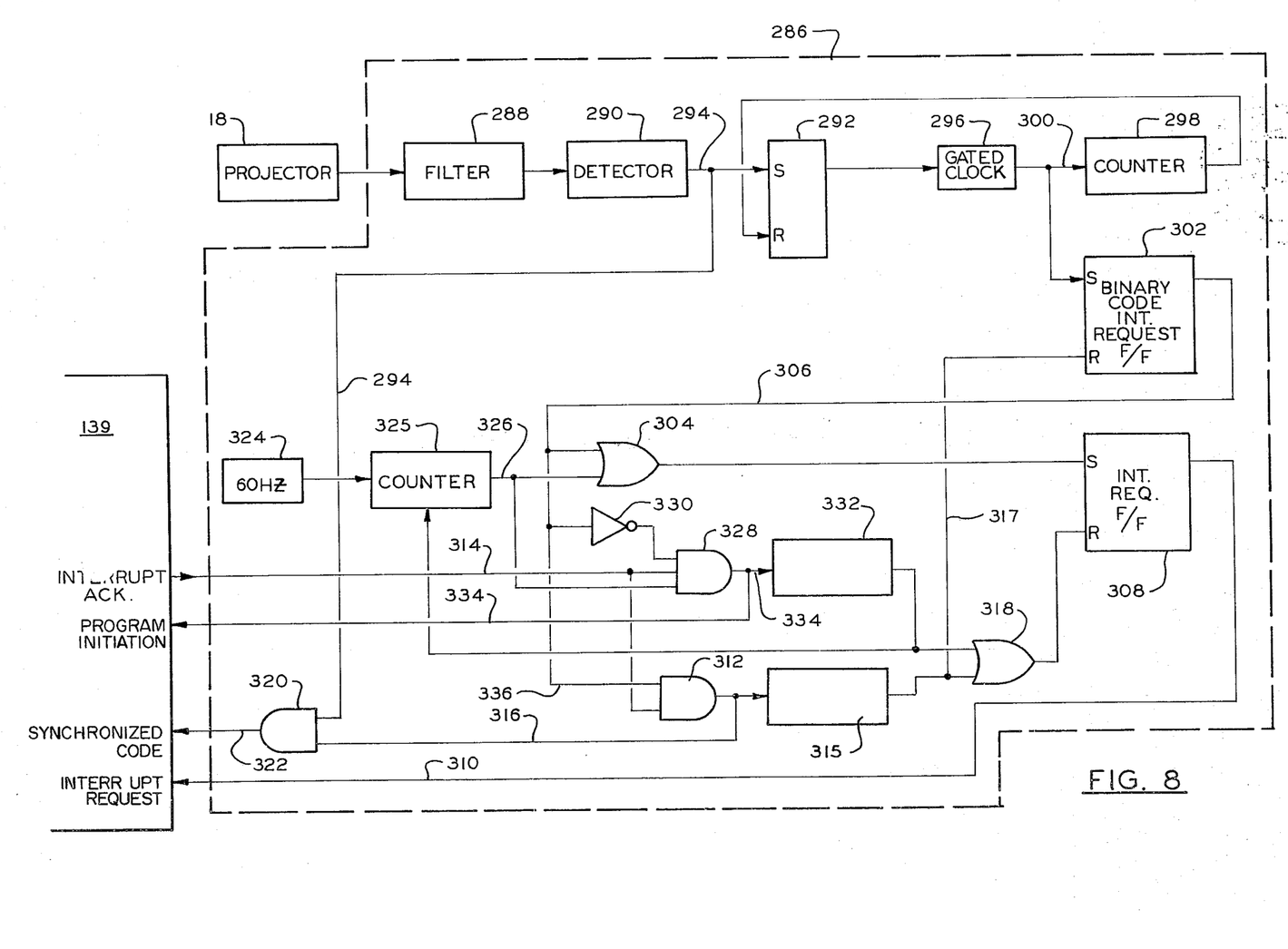
FIG. 8 is a schematic block diagram of an interrupt circuit in the pedestal cabinet included in the preferred embodiment of FIG. 1.

Referring now to FIG. 8, included in the interface circuits 109 is an interrupt circuit 286 which detects the binary coded signal pulses provided by the projector 18 and provides synchronized binary coded logic signals to the computer 139. Additionally, the interrupt circuit 286 provides a program initiation logic signal to the computer 139. In response to the program initiation logic signal being ONE, the computer 139 provides and receives the logic signals referred to hereinbefore.

On the film in the projector 18, the sounds recorded on the sound track include a portion which may be used to provide an audio presentation simultaneously with the provision of the view of the roadway. Additionally recorded on the sound track are the binary coded signal pulses.

The projector 18 is connected to a bandpass filter 288 whereby audio signals which are representative of the recording on the sound track are filtered. Because of the filtering, only the binary coded signals are provided at the output of the filter 288.

Connected to the output of the filter 288 is the input of a binary code detector 290. In response to the binary coded signal pulses, the detector 290 provides corresponding binary coded logic signals. In this embodiment, a binary code representative of a desired response is comprised of six binary coded signal pulses, the first pulse of a series always corresponding to ONE.

The output of the detector 290 is connected through a signal line 294 to the set input of a code-in progress flip-flop 292 (similar to the flip-flop 230 referred to hereinbefore) which provides a code in progress logic signal. Therefore, in response to the first of a series of binary coded signals the code in progress logic signal is ONE.

The output of the flip-flop 292 is connected to a gating input of a gated clock pulse generator 296. In response to the code in progress logic signal being ONE, the clock pulse generator 296 provides a series of ONEs at substantially the same rate that the binary coded logic signals are provided.

The output of the clock pulse generator 296 is connected to the input of a first counter 298 through a signal line 300. In response to the clock pulse generator 296 providing six ONEs, the first counter 298 provides a ONE which persists for a short time duration, ZERO being provided thereafter. The output of the first counter 298 is connected to the reset input of the flip-flop 292 thereby causing a code in progress logic signal of ZERO after the six ONEs are provided.

The output of the clock pulse generator 296 is additionally connected through the signal line 300 to the set input of a binary code interrupt request flip-flop 302 (similar to the flip-flop 230 referred to hereinbefore) which provides a binary code interrupt logic signal. Therefore, in response to ONE provided by the clock pulse generator 296 the binary code interrupt logic signal is ONE.

The output of the flip-flop 302 is connected to one of two inputs of an OR gate 304 (similar to the OR gate 236 (FIG. 7) referred to hereinbefore) through a signal line 306. The output of the OR gate 304 is connected to the set input of an interrupt request flip-flop 308 (similar to the flip-flop 230 referred to hereinbefore) whereby the binary code interrupt logic signal is provided through the OR gate 304 to the flip-flop 308. In response to the binary interrupt logic signal, flip-flop 308 provides an interrupt request logic signal whereby the interrupt request logic signal is ONE whenever the binary interrupt logic signal is ONE. The output of the flip-flop 308 is connected through a signal line 310 to the computer 139 to provide thereto the interrupt request logic signal.

The computer 139 provides an interrupt acknowledge logic signal through a signal line 314 to one of two inputs of an AND gate 312 (similar to the AND gate 232 (FIG. 7) described hereinbefore), the other input being connected to the output of the flip-flop 302 through the line 306. In concurrent response to the binary code interrupt request and the interrupt acknowledge logic signals, the AND gate 312 provides a binary code sync logic signal.

The output of the AND gate 312 is connected to the input of a delay network 315 (similar to the delay network 278 (FIG. 7) described hereinbefore) through a signal line 316. The output of the delay network 315 is provided to a reset input of the flip-flop 302 through a signal line 317 whereby at a known delay time after the binary code interrupt request and the interrupt acknowledge logic signals are concurrently ONE, ONE is provided by the delay network 315. In response thereto, the binary code interrupt request and the code sync logic signals are both ZERO.

The output of the delay network 315 is additionally connected to an input of an OR gate 318 (similar) to the OR gate 236 (FIG. 7) referred to hereinbefore). The output of the OR gate 318 is connected to a reset input of the flip-flop 308 whereby the interrupt request logic signal is ZERO in response to ONE provided by the delay network 315 through the OR gate 318.

The output of the AND gate 312 is connected through the line 316 to one of two inputs of an AND gate 320 (similar to the AND gate 232), the other input being connected to the output of the detector 290 through the line 294. The output of the AND gate 320 is connected to the computer 139 through a signal line 322 whereby a synchronized code logic signal is provided in concurrent response to the code sync and the binary code logic signals. The synchronized code logic signal is ONE for the same duration that the interrupt acknowledge logic signal is ONE whereby the synchronized logic signal is in accordance with a logic signal format of the computer 139 and is received thereby. It should be understood, that except for differences of initiation and duration, a synchronized logic signal is the same as a corresponding binary code logic signal.

The program initiation signal is provided to the computer 139 in response to clock pulses provided at a 60 Hz rate by a real time clock 324. The output of the clock 324 is connected to the input of a second counter 325 which provides ONE in response to six clock pulses. The output of the counter 325 is connected to an input of the OR gate 304 through a signal line 326 whereby the interrupt request logic signal is ONE in response to ONE being provided by the counter 325.

The counter 325 is additionally connected to one of three inputs of an AND gate 328 through the line 326, other inputs being connected to the computer 139 through the line 314 and to the output of an inverter 330. ONE is provided at the output of the AND gate 328 in concurrent response to ONE being provided at the three inputs thereof. Provided at the output of the AND gate 328 is the program initiation logic signal referred to hereinbefore.

The input of the inverter 330 is connected to the output of the flip-flop 302 through the line 306. The inverter 330 provides at the output thereof the inverse of the logic signal provided at the input. Accordingly, in response to the binary code interrupt request logic signal being ONE, the program initiation logic signal is ZERO. Thus, the program initiation logic signal is ONE in concurrent response to the counter 325 providing ONE, the interrupt acknowledge logic signal being ONE and the binary code interrupt request logic signal being ZERO. Therefore, a program initiation logic signal is not provided to the computer 139 when a synchronized binary coded logic signal is provided.

The output of the AND gate 328 is connected to the input of a delay network 332 (similar to the delay network 278 (FIG. 7) described hereinbefore) through a signal line 334. The output of the network 332 is connected to a reset input of the counter 325 through a signal line 336. In response to ONE being provided by the network 332, the counter 325 provides ZERO; in response thereto the program initiation logic signal is ZERO.

The output of the AND gate 328 is additionally connected to the computer 139 through the line 334 thereby providing thereto the program initiation logic signal. The program initiation logic signal is ONE for the same duration that the interrupt acknowledge logic signal is ONE whereby the program initiation logic signal is in accordance with a logic signal format of the computer 139 and is received thereby.

Thus there has been shown a driver trainer for training students in manipulative skills used in driving a vehicle and exposing students to simulated situations encountered in driving.

It should be understood that in alternative embodiments of the present invention, the simulator cars 14a may be provided with a clutch pedal which may be utilized in conjunction with a manual gearshift lever for instructing students in the manipulated skills associated with manually-shifted vehicles.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by letters Patent of the United States is:

1. A driver trainer system comprising:
   a simulator motor vehicle which includes simulated controls and simulated instruments corresponding to controls and instruments of a motor vehicle, whereby said controls may be manipulated to perform vehicular functions and said instruments may be observed by a student in said simulator motor vehicle, said simulator motor vehicle including means for providing function signals respectively representative of positions of said controls;
   console means for providing indications of actual vehicular functions performed within said simulator motor vehicle and corresponding desired performance of said vehicular functions, said console means including grade trend indicator means for providing an indication if the student's percentage of correct performances of a selected function is less than a selected percentile number, said grade trend indicator means including percentile number selection means for providing a grade trend signal representative of a selected percentile number and vehicular function selection means for providing a selection signal representative of a selected function; and
   a digital computer connected to said simulator motor vehicle and said console means, said computer receiving and processing said function signals, grade trend signal and selection signal to provide signals to said simulator motor vehicle and said console means whereby excitation is provided to said simulated instruments and said indications are provided by said console means.

2. A driver trainer according to claim 1 further including:
   a projector for projecting a filmed view of said roadway and providing from a sound track of said film signals representative of said desired performance of vehicular functions, said projector being connected to said computer.

3. A driver trainer according to claim 1, comprising:
   an accelerator pedal within said simulator motor vehicle;
   accelerator means connected to said accelerator pedal for providing an accelerator pedal function signal having an amplitude proportional to the depression of said accelerator pedal;
   a digital-to-analog converter connected to said digital computer, for providing an approximate accelerator signal in response to a signal from said computer; and
   a comparator connected to said accelerator means, said digital-to-analog converter, and said computer, for comparing said accelerator pedal function signal with said approximate accelerator signal and for providing to said computer a comparison signal indicative of the larger one of said accelerator signals, whereby said approximate accelerator signal is adjusted to cause a decrease in the difference in amplitudes of said accelerator signals.

4. The driver trainer system of claim 1 wherein a plurality of such simulator motor vehicles are connected to said digital computer; and said grade trend indicator means provides an indication of those simulator motor vehicles in which the percentage of correct performances of said selected function is less than said selected percentile number.

5. The driver trainer system of claim 4 wherein:
   said console means includes means to selectively provide indications of actual vehicular functions performed within any one of said simulator motor vehicles; and
   said grade trend indicator means includes segmented display lamps which, when illuminated, provide a display of designations of those simulator motor vehicles where a percentage of correct performances of a selected function is less than the selected percentile number.

6. In a system for training vehicle operators wherein actual performances of vehicular functions by students on simulated controls are monitored and compared with desired performances of said vehicular functions to determine the correctness of said actual performances, the improvement comprising the combination of: percentile selection means providing a range of percentile numbers from which a selected percentile number may be chosen; vehicular function of selection means providing a plurality of vehicular functions from which a selected function may be chosen;

means for calculating the percentage of correct performances of a selected vehicular function for each of said students;

means for comparing each student's percentage of correct performances with a selected percentile number; and     means responsive to said comparing means for providing an indication of those students whose percentage of correct performances of said selected function is less than said selected percentile number.

7. The invention of claim 6 wherein said means for calculating and means for comparing comprise a digital computer.

8. The invention of claim 7 wherein:

said percentile selection means provides a signal representative of said selected percentile number to said computer, and     said vehicular function selection means provides a signal representative of said function to said computer; and wherein said indication providing means comprises:

display means, controlled by said computer, for displaying designations of those students whose percentage of correct performances of the selected function is less than the selected percentile number.

9. The invention of claim 8 wherein said means for selecting a vehicular function comprises a plurality of function push-buttons; and said means for selecting a percentile number comprises an adjustable thumbwheel switch.

* * * * *